United States Patent [19]

Hough et al.

[11] Patent Number: 5,168,970
[45] Date of Patent: Dec. 8, 1992

[54] ELECTROMAGNETIC CRUISE CONTROL FOR A LAWN AND GARDEN TRACTOR

[75] Inventors: Barry M. Hough, West Bend; Howard A. Louden, Horicon, both of Wis.

[73] Assignee: Deere & Company, Moline, Ill.

[21] Appl. No.: 784,357

[22] Filed: Oct. 29, 1991

[51] Int. Cl.⁵ .................. B60K 41/26; B60K 31/02
[52] U.S. Cl. ..................... 192/4 R; 74/474; 74/475; 188/67; 188/161
[58] Field of Search .......... 192/4 R, 4 C, 4 B; 74/474, 475, 531; 180/307, 336; 188/67, 161, 163

[56] References Cited

U.S. PATENT DOCUMENTS

| | | | |
|---|---|---|---|
| 3,618,718 | 11/1971 | Blaauw et al. | 192/4 B |
| 3,645,368 | 2/1972 | Blaauw | 192/4 C |
| 4,023,636 | 5/1977 | Levin | 188/163 |
| 4,496,035 | 1/1985 | Wanie | 192/4 C |
| 4,608,879 | 9/1986 | Ishida et al. | 74/474 |
| 4,620,575 | 11/1986 | Cuba et al. | 180/307 |

OTHER PUBLICATIONS

Bolens "DuraTrac Tractor" Safety and Operations Instructions (9/89).

Primary Examiner—Richard Lorence

[57] ABSTRACT

A relatively simple electromechanical cruise control for a vehicle includes a hydrostatic drive linkage having a flat portion connecting two links and extending adjacent an electromagnet fixed to the frame of the vehicle. Actuation of the control under preselected operating conditions activates the electromagnet to hold the flat portion stationary and thereby maintain a given hydrostatic control position. Interlock circuitry deactivates the magnet if the operator touches the brake, leaves his seat or turns off either the cruise switch or ignition switch.

10 Claims, 2 Drawing Sheets

ELECTROMAGNETIC CRUISE CONTROL FOR A LAWN AND GARDEN TRACTOR

BACKGROUND OF THE INVENTION

1) Field of the Invention

The present invention relates generally to vehicles with hydrostatic transmissions, such as lawn and garden tractors, and more specifically to a speed or cruise control for such a vehicle.

2) Related Art

Controls for an off-road vehicle having a hydrostatic transmission typically include a direction control level, or direction control pedals, along with some form of transmission speed ratio control which may be a separate lever or pedal or which may be combined with the direction control devices. With many transmission systems, a foot pedal is utilized to select speed ratio and must be continuously held in the desired position during operation of the vehicle. Maintaining the transmission in the desired speed ratio becomes difficult over extended periods of operation. Although numerous speed ratio controls have been available, most of the controls have suffered from one or more disadvantages. A number of the mechanically operated speed ratio controls required numerous parts such as additional linkages which add to the cost and complexity of the transmission system. Mechanical devices are often difficult to assemble and adjust; such devices can wear over time and not engage or hold a selected ratio properly. Electrically operated hydrostatic cruise controls have typically employed extra linkages or special electromagnetic clutches which require additional space on the vehicle and add complexity to the system. A relatively high holding force is necessary, and circular electromagnetic clutches have been utilized to maintain the desired control pedal position.

BRIEF SUMMARY OF THE INVENTION

It is therefore an object of the present invention to provide an improved cruise control for a vehicle such as a lawn and garden tractor. It is a further object to provide such a cruise control which overcomes the aforementioned problems.

It is another object of the present invention to provide an improved cruise control system for a hydrostatically driven vehicle which is simpler in construction and more reliable than at least most previously available cruise controls. It is yet another object to provide such a control system which is compact and requires only a relatively few extra parts.

It is a further object of the invention to provide an improved cruise control system for use with a hydrostatic transmission linkage which advantageously utilizes a portion of the linkage to reduce the number of additional components and space requirements for the system. It is still another object to provide such a system with a relatively simple and inexpensive electromechanical device which reliably holds a desired speed ratio.

In accordance with the above, a cruise control system is provided having a linkage with a flat portion which moves adjacent to a frame-mounted electromagnet as the foot pedal or speed control is adjusted for the hydrostatic transmission. A latch circuit selectively powers the electromagnet to hold the flat portion of the hydro linkage when the cruise control and ignition switches are turned on, the operation is in his seat and the vehicle brake is off. Since fewer and less complex parts are necessary than with most previously available cruise control systems, the device is more compact, easier and less expensive to manufacture and more reliable.

These and other objects, features and advantages of the present invention will become apparent to one skilled in the art upon reading the following detailed description in view of the drawings.

DETAILED DESCRIPTION OF THE DRAWINGS

Figure 1:
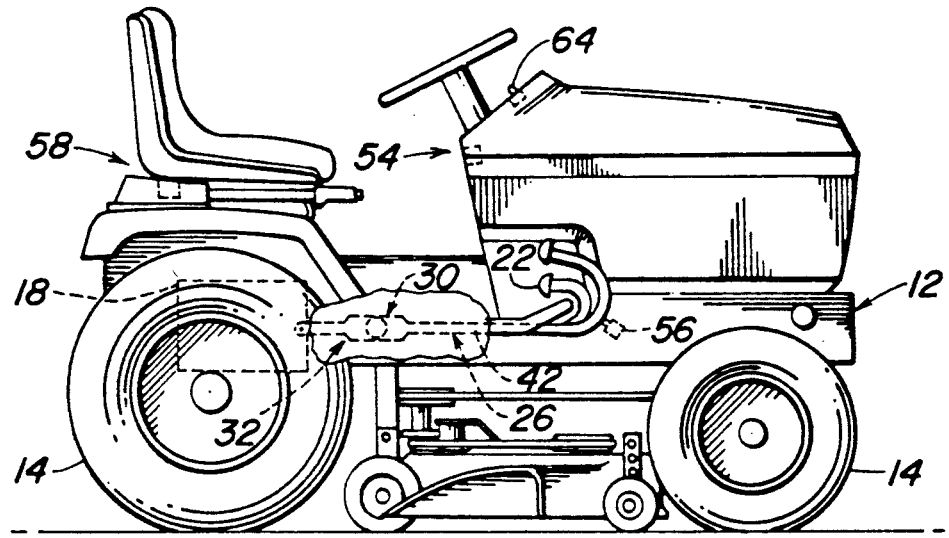
FIG. 1 is a view of a vehicle partially broken away to show the cruise control of the present invention.

Referring now to FIG. 1, therein is shown a vehicle 10 such as lawn and garden tractor having a frame 12 supported for forward movement over the ground by wheels 14. The wheels are powered through a conventional hydrostatic transmission 18 having a speed control 22 which as shown in FIG. 1 is a foot-operated pedal connected by hydroshift linkage structure 26 to the transmission. As the pedal 22 is depressed, the linkage structure 26 is moved to change the ratio of the transmission and increase the ground speed of the vehicle. Releasing the pedal will result in the control automatically returning to a neutral position.

Figure 2:
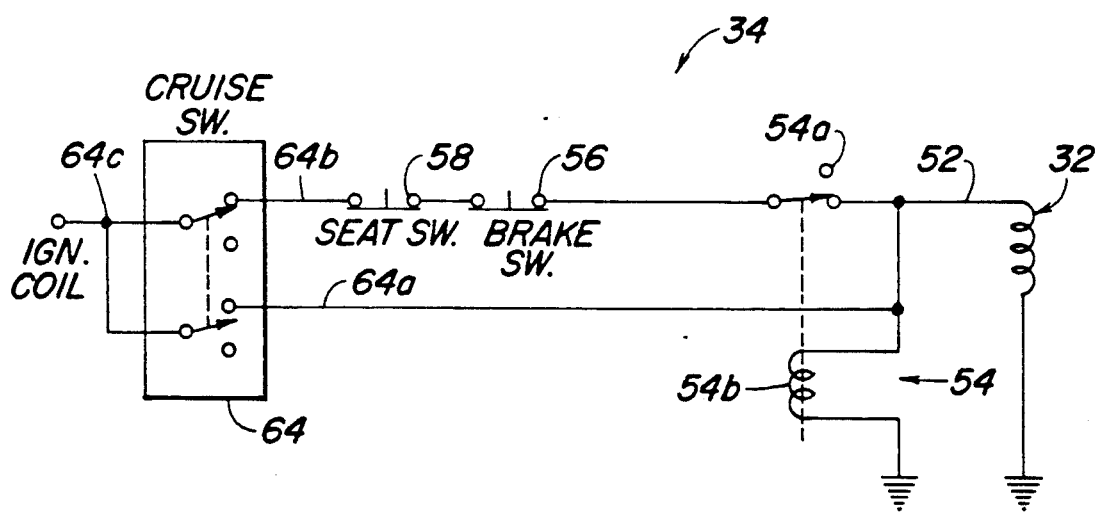
FIG. 2 is a schematic representation of the circuit for the cruise control.
Figure 3:
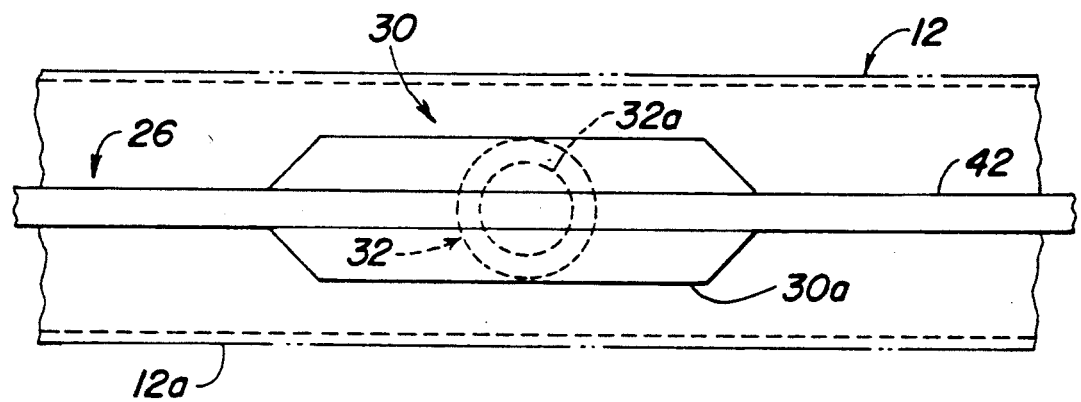
FIG. 3 is a side view of the cruise control linkage.
Figure 4:
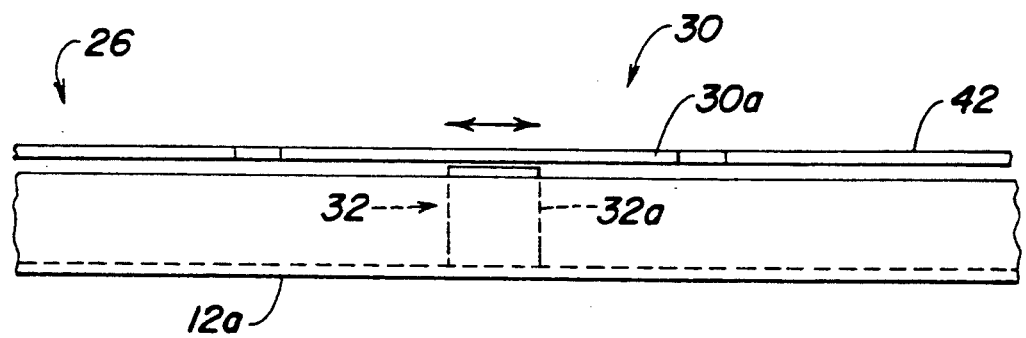
FIG. 4 is a top view of the linkage of FIG. 3.

To avoid the need for the operator to keep his foot on the pedal 22, a cruise control is provided for selectively maintaining the linkage structure 26 in a given position. The cruise control structure includes a flat metal linkage portion 30 forming a part of the linkage structure 26, an electromagnet 32, and a latch circuit 34 (FIG. 2) operably connected to the electromagnet 32. The electromagnet 32 is supported from the frame 12 adjacent the linkage portion 30, and when the latch circuit 34 activates the electromagnet, the linkage portion 30 is held against the magnet so that the linkage structure 26 maintains the selected speed ratio.

The linkage structure 26 includes a link 42 connected between the pedal 22 and the transmission 18 and a flat metal linkage portion 30 located closely adjacent and extending parallel to a side frame member 12a. As the foot pedal 22 is moved, the portion 30 moves in the fore-and-aft direction with the link 42, generally parallel to the link axis. The linkage portion 30 tapers outwardly to a widened central section 30a having a width slightly larger than the width of the flat end (32a) of the electromagnet 32. The section 30a has a length at least equal to the distance of linkage travel corresponding to the range of transmission ratios for which cruise control is desired.

The electromagnet 32 is fixed to the frame member 12a closely adjacent the flat central section 30a such that the linkage portion 30 substantially covers the flat end 32a for all linkage travel within the control range. The coil of the electromagnet 32 is connected by line 52 (FIG. 2) to a latching relay 54. The relay 54 includes a switch 54a having an input terminal connected in series with condition responsive switches such as a brake switch 56 and an operator presence switch 58. The relay output terminal is connected to the relay coil 54b and to one output terminal 64b of a cruise switch 64. A second output terminal 64b of the switch 64 is connected to the input of the condition responsive switch line. Input terminals 64c are connected to the ignition coil output to provide power to the switch 64.

The lower terminal 64a of the cruise switch 64 is connected through a momentary off-off-momentary on switch to the input terminal 64c. The output terminal 64b is connected through a momentary on-on-momentary off switch to the input terminal 64c. When the cruise switch 64 is switched from the off position to the on position, the terminal 64a is energized momentarily to activate the relay 54 and close the switch 54a. The relay coil 54b is bootstrapped to the output of the switch 54a when the brake and seat switches are closed, and power will be supplied via terminal 64b to the relay coil to maintain the switch 54a closed and activate the cruise magnet 32. Any time power is interrupted to the switch 54a (i.e., by turning off the cruise switch 64, opening the brake switch 56 by applying the brake, or opening the seat switch 58 by leaving the operator station), the relay 54 will deactivate. Once power is interrupted for any reason and the relay 54 is deactivated, the operator must again operate the cruise switch 64, with power on and the switches 56 and 58 closed, before cruise control can be reestablished.

Assuming the operator is on the vehicle and the desired operating speed ratio has been selected with the foot or other control 22, the operator may move the cruise switch 64 to the on position to close the relay switch 54a and activate the electromagnet 32. The flat metal linkage portion 30 is then attracted to and held relative to the frame 12 by the electromagnet 32 to maintain the hydroshift linkage structure 26 in the position that it was at when the electromagnet was activated. The operator then is free to remove his foot from the control 22, and the selected speed is maintained until power is interrupted, the switch 64 is pushed to the off position, or the brake or seat switch 56 or 58 is opened. Once power is interrupted to the electromagnet 32, the linkage structure 26 automatically moves to the neutral position or to the position determined by the operator's foot on the control 22. Although the holding force of the electromagnet 32 (typically about 75 pounds) on the flat portion 30 is sufficient to hold the linkage structure 26 against the bias which return the transmission to neutral, the operator may move the control 22 to urge the flat portion 30 across the flat portion 32a of the activated electromagnet to select a different speed without having to first disengage the cruise control. The newly selected speed is held once the operator removes his foot from the speed control 22.

Having described the preferred embodiment, it will become apparent that various modifications can be made without departing from the scope of the invention as defined in the accompanying claims.

What is claimed is:

1. In a lawn and garden vehicle with a frame, a drive structure including an engine and a driven transmission operably connected to ground wheels for driving the vehicle at varying ground speeds, and a selectively positionable speed control, a cruise control comprising:

an elongated linkage having a link axis and a flat linkage portion, wherein the flat linkage portion lies generally on the link axis and comprises a portion of the length of the linkage;

means connecting the linkage between the speed control and the drive structure for movement with the speed control for varying the ground speed, wherein the flat linkage portion lies directly between the speed control and the drive structure;

a magnet connected to the frame adjacent the flat linkage portion; and means for selectively activating the magnet to hold the flat linkage portion in a given position and thereby maintain a given ground speed.

2. The invention as set forth in claim 1 wherein the magnet comprises an electromagnet fixed to the vehicle frame.

3. The invention as set forth in claim 2 wherein the flat linkage portion comprises a flat metal plate.

4. The invention as set forth in claim 1 wherein the magnet includes a flat surface parallel to and closely adjacent the surface of the flat linkage portion and wherein the flat linkage portion moves linearly and parallel to the flat surface of the magnet when the speed control is moved, the flat portion of the link having a length sufficient to remain adjacent the flat surface of the magnet when the speed control is moved over a range of positions corresponding to a range of selectible cruise control speeds.

5. The invention as set forth in claim 1 wherein the magnet comprises an electromagnet, and the means for selectively activating comprises a cruise control switch, a latching related connected to the electromagnet, a brake switch for providing an indication of vehicle brake operation, and means connecting the cruise control switch to the latching relay and brake switch.

6. The invention as set forth in claim 1 wherein the linkage is connected to the transmission and is biased toward a preselected position wherein the transmission automatically returns to a neutral state, and wherein the magnet has sufficient holding force when activated to maintain a given transmission speed against the bias.

7. The invention as set forth in claim 6 wherein the holding force of the magnet is selected such that the linkage may be urged by the speed control to a new position to select a different cruise control speed while the magnet is activated.

8. In a lawn and garden vehicle with a frame, an engine-driven hydrostatic transmission operably connected to ground wheels for driving the vehicle at varying ground speeds, and a selectively positionable speed control, a cruise control comprising:

an elongated linkage having a link axis, first and second ends and a metal linkage portion, the linkage portion comprising a part of the linkage length and lying generally on the link axis between the first and second ends;

means connecting the first and second ends of the linkage between the speed control and the transmission, respectively, for movement of the linkage portion generally in the direction of the link axis with the speed control for varying the output speed of the transmission to thereby vary the ground speed, the linkage being biased toward a preselected position corresponding to a neutral condition of the transmission;

a magnet connected to the frame adjacent the metal linkage portion, the magnet having a surface complimentary to the metal linkage portion; and means for selectively holding the surface of the magnet and the metal linkage portion in contact with each other to prevent the linkage from moving toward the preselected position, thereby maintaining a given transmission output speed.

9. The invention as set forth in claim 8 wherein the metal linkage portion and the magnet surface are parallel and move parallel relative to each other when the speed control is moved, the metal linkage portion having a length sufficient to remain adjacent the flat surface of the magnet when the speed control is moved over a range of positions corresponding to a range of selectible cruise control speeds.

10. The invention as set forth in claim 9 wherein the linkage is elongated in an axial direction and the metal linkage portion moves parallel to the axis.

* * * * *